Feb. 7, 1961     W. L. CARLSON, JR     2,971,128
LOAD PROTECTION DEVICE
Filed Dec. 24, 1956

*INVENTOR.*
*WILLIAM L. CARLSON, JR.*
BY *Joseph E. Ryan*
*ATTORNEY*

United States Patent Office 2,971,128
Patented Feb. 7, 1961

2,971,128

LOAD PROTECTION DEVICE

William L. Carlson, Jr., Bloomington, Minn., assignor to Minneapolis-Honeywell Regulator Company, Minneapolis, Minn., a corporation of Delaware Filed Dec. 24, 1956, Ser. No. 630,176

5 Claims. (Cl. 317—9)

This device is an adjustable load protection unit, and more specifically is a load protection device that utilizes the principle of a conductive fluid relay and a conductive fluid interlock circuit.

In general, electrical load protection devices commonly used operate on two broad principles. The first is on an electromagnetic principle that as the current rises, a magnetic flux generated operates a solenoid plunger or a relay armature. Thus, at a predetermined energization the protected circuit is disrupted. The second type of overload protector is based upon the heating effect of a current passing through a metal. Examples of this type are the common fuse and the bimetal operated overloads.

Both types of overloads described above have numerous moving parts and are subject to variations caused by friction and wear. Also, the heat operated types are subject to variation due to ambient conditions and deterioration caused by the heating. In the present case, the only moving part is a conductive fluid, and this fluid device has practically none of the problems of more conventional units.

The use of conductive fluids and inductive or conductive fluid pumps to provide a relay function has long been recognized in the art. This type of relay has been built in the past, wherein, a conductive fluid pump moves a fluid in or out of a chamber to short or open circuit an electrode structure. The control in turn was used to operate a second circuit in a manner well known in the relay art. In this type of device, it is understood that the pumping pressure is a function of the amount of energization supplied to the pump. In the present application, the disclosed device utilizes certain of the conductive fluid relay principles to develop a completely new load current limiter or protection device.

In the novel device disclosed a conductive fluid relay type function is utilized, but the relay not only controls the load, it is in series with the conductive fluid pump. It can thus be seen that as the load current increases, the pumping pressure developed increases. This eventually breaks the circuit to the load and the pump. At this same time, a second electrode structure is shorted by the fluid and the pump is energized in the same direction as previously energized. This provides the lockout feature needed to make the device a load protection unit.

It is thus apparent that an object of this disclosure is to provide a new load protection device having a simple structure wherein the only moving part is a conductive fluid.

It is a further object of this unit to provide an overload device which has good temperature stability since the current controlled has little or no heating effect on the device itself.

Still a further object is to disclose a load protection device that is inexpensive and capable of handling substantial loads.

These and other objects will become apparent when the single sheet of drawings is considered with the following discussion, wherein.

Figure 1:
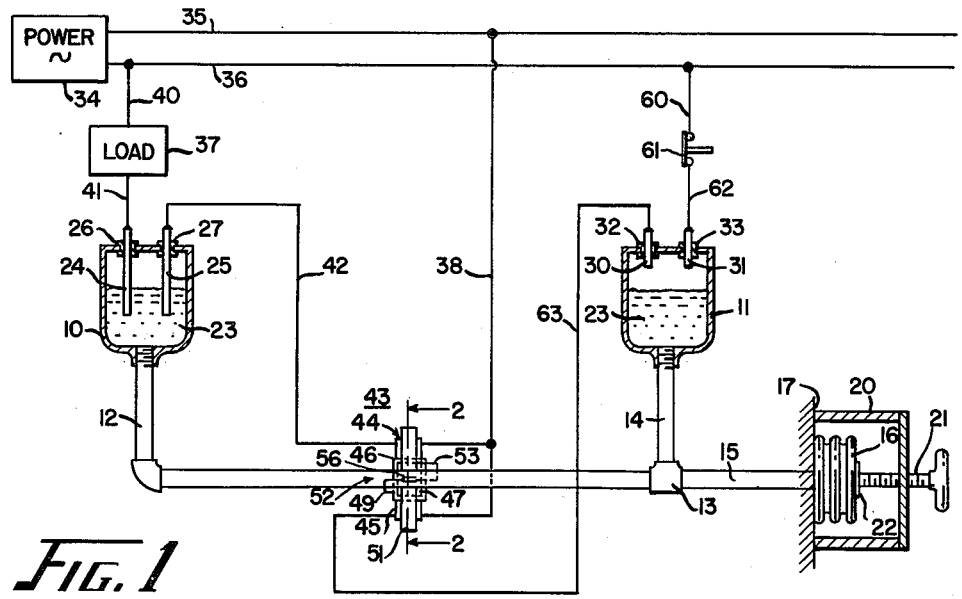
Figure 1 is a schematic representation of one embodiment of the novel device.

Two substantially identical chambers 10 and 11 are joined by a section of pipe 12, a T 13, and a section of pipe 14. The T 13 has an additional section of pipe 15 directly in line with pipe 12. Pipe 15 is connected to a bellows 16 which is in turn mounted on a fixed surface 17. Also attached to the fixed surface 17 is a frame work 20 which supports a thumb screw 21. The thumb screw 21 bears on a plate 22 which is attached to bellows 16. The purpose of the bellows 16, framework 20 and thumb screw 21 will become apparent as the disclosure progresses and will be explained in more detail below.

A fluid reservoir is formed by components 10, 11, 12, 13, 14, 15, and 16. The reservoir is partially filled with a conductive fluid 23, and its level is shown in the chambers 10 and 11. If the level of the fluid 23 need be varied in the chambers 10 and 11 the thumb screw 21 can be adjusted either compressing or expanding the bellows 16. By this arrangement the total overall volume of the reservoir is changed and the level of the fluid 23 is adjusted.

Inserted in the top of chamber 10 are two electrodes 24 and 25. Since the chamber 10 may be of a conductive nature, electrically insulated inserts 26 and 27 are placed around the electrodes 24 and 25. It will be noted, in Figure 1, that in a normal condition of operation the electrodes 24 and 25 are immersed in fluid 23.

Chamber 11 has a pair of electrodes 30 and 31 which are insulated from the chamber 11 by inserts 32 and 33. The length of electrodes 24 and 25 are selected such that the fluid 23 in chamber 10 is just touching the electrodes 24 and 25 when the fluid 23 in chamber 11 makes its initial contact with electrodes 30 and 31. The reason for the selection of this particular quantity of conductive fluid and lengths of electrodes will become apparent when the overall operation of the device is explained below.

A source of power is supplied at 34 and is shown as an alternating current source which is distributed on conductors 35 and 36. A load 37 is shown connected to wire 36 by conductor 40 and then in turn to electrode 24 by conductor 41. Electrode 25 is connected to a conductor 42 which is in turn connected through an electromagnetic conductive fluid pump generally shown as 43 by means of a coil 44 and a conductor 38 back to conductor 35 of the power supply 34. It is apparent with the arrangement shown that a current flows from the power source 34 through the load 37 by means of the conductive fluid 23 short circuiting the electrodes 24 and 25 and then passes through the coil 44 of the pump 43.

Figure 2:
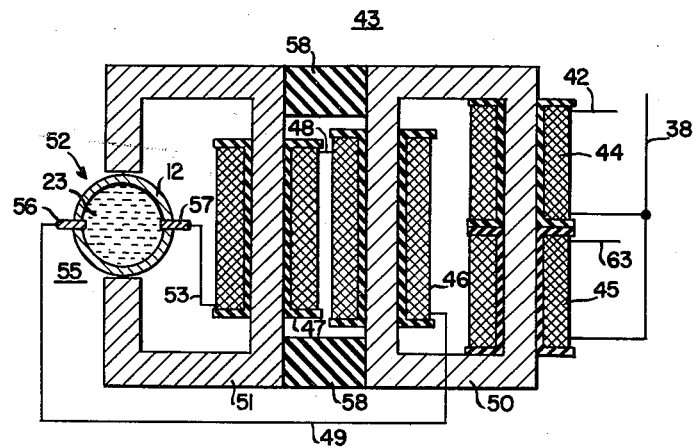
Figure 2 is a cross section of the fluid pump used, and the section is taken along lines 2—2 of Figure 1.

The pump 43 is shown in schematic cross section in Figure 2. Pump 43 includes a closed magnetic circuit 50 encircled by coils 44 and 45. The current ratios of coils 44 and 45 can be the same or different depending upon the application of the unit, but it is understood that they are conventional coils similar to those used in the transformer art. Also encircling the core 50 is a coil 46, which in effect is a secondary winding under the influence of either coil 44 or 45, or a combination of coils 44 and 45. It will be obvious that at any time coil 44 or 45 is energized that a flux will link coil 46 by means of the core 50. A second magnetic core 51 is provided and the core 51 has an opening at 52 which permits the pipe 12 to pass through the magnetic circuit of a core 51. Core 51 is further encircled by a coil 47 which is connected in series with coil 46 by means of conductors 48, 49, and 53, in conjunction with an electromagnetic conductive fluid pump gap 55 which is placed in the opening 52 of core 51. It will be understood that currents induced in coil 46 on the magnetic structure 50 will flow through conductor 48, coil 47, conductor 53, the gap 55, and the conductor 49. The magnetic core structures 50 and 51 can be completely independent units or can be joined by nonmagnetic members 58 in any convenient manner. In effect structure 50 is a transformer of conventional design that is used to energize the electromagnetic pump structure 51.

The electromagnetic conductive fluid pump gap 55, in its simplest form, consists of a section of pipe 12 having two electrodes 56 and 57 inserted in its side. Since the fluid 23 is conductive in nature it is obvious therefore that a complete electrical path exists between the coil 47, the electrodes 56 and 57, conductor 49, and coil 46. The electrodes 56 and 57 are inserted in the tube 12 in a fluid tight manner and are perpendicular to the direction of flux in the gap 52 of the magnetic structure 51. With this arrangement it becomes apparent that a current flows through the conductive fluid perpendicular to the magnetic field and based on the motor principles discovered by Faraday a force will be created in the fluid 23 in a direction along the length of pipe 12. It is obvious therefore, that upon energization of coil 44 or 45, or energization of both of these coils which yields a net flux in core 50, that a pumping pressure exists in the electromagnetic pump gap 55 along the pipe 12. This pumping pressure is a function of the amount or degree of energization of the pump 43 and thereby an increased amount of energization will increase the pumping pressure in the gap 55. As previous pointed out the pipe 12 can be of any convenient material, and may even be a metal. If the pipe 12 is metallic in nature its electric conductivity should be substantially less than the conductivity of the fluid 23 so that the efficiency of the pump in passing current between electrodes 56 and 57 is not materially reduced.

A second electric circuit is presented by conductor 36 through conductor 60, a normally closed push button type switch 61, conductor 62 and electrode 31. When the conductive fluid 23 joins electrodes 30 and 31 a circuit is completed from electrode 30 through conductors 63, coil 45, and conductor 38.

Operation

If the load protective device disclosed in Figure 1 is considered in operation as shown, it is possible to trace a load current path from the power source 34 through conductor 40, load 37, conductor 41, electrode 24, fluid 23, electrode 25, conductor 42, coil 44, and conductor 38 back to the power source 34. A continuous load current is thus drawn but if the load current increases the pressure of pump 43 becomes greater and the conductive fluid 23 is moved in pipe 12 from chamber 10 to chamber 11. It will become apparent that if the current becomes great enough through load 37 that the pumping pressure developed by pump 43 will be sufficient to lower the level of fluid 23 in chamber 10 until the electrodes 24 and 25 are just barely immersed in the fluid. At this particular point the fluid 23 in chamber 11 has risen such that it just contacts electrodes 30 and 31. Upon completion of the contact between electrodes 30 and 31, a second energizing circuit is made through the pump 43 by means of the conductor 60, switch 61, conductor 62, electrode 31, fluid 23, electrode 30, conductor 63, coil 45, and conductor 38 back to the power source 34. The energization of the coil 45 is cumulative with the energization of coil 44 and thereby the pump's energization is substantially increased. This increases the pumping pressure and causes the fluid 23 to continue to shift from chamber 10 to chamber 11. The impedance of coil 45 is selected such that once it is put into the circuit it energizes pump 43 to a sufficiently large degree to pump the fluid 23 into chamber 11 and out of contact with electrodes 24 and 25. It will be obvious that with this arrangement that the load circuit is opened and is kept opened until the circuit through coil 45 is interrupted. Interruption of the circuit through coils 45 is accomplished by the push button switch 61 and thereby switch 61 becomes a reset for the overload device. Upon breaking the circuit at 61, the pressure developed on the atmosphere between the fluid 23 in chamber 11 and the top of chamber 11 is great enough to force the fluid 23 to flow naturally back through pipe 14, T 13, and pipe 12 into the chamber 10 and thereby establishing the load circuit once again. Due to the nature of the construction of chambers 10 and 11 and the quantity of fluid 23 contained in the overall system, there is little or no heat problem involved in the use of this overload. Any heat that is generated is immediately carried away by the conductive fluid 23 and radiated to the surrounding atmosphere which encloses the device. It can therefore be seen that this device is capable of handling substantial amounts of power without creating the normal temperature shift involved or encountered in more conventional types of load protection devices.

It will be further noted that if the chamber 11 were not used, thereby eliminating the need for the coil 45, that the remainder of the device could be used as a current limiting unit which would merely cycle on and off at some average value of load current through load 37. It is obvious that additional modifications could be made in this arrangement beyond those mentioned specifically in the above embodiment and it is therefore noted that the applicant wishes to be limited in scope only by the appended claims.

I claim as my invention:

1. In a device of the class described: power means; conductive fluid reservoir means partially filled with a conductive fluid and including two chambers joined by passage means; each said chamber including a separate atmosphere isolated in said chamber between said fluid and the top of said chamber; at least one of said chambers including current control means which is activated by said conductive fluid; pump means included in said passage means between said chambers; said pump means energized by said power means through a circuit including said current control means, said fluid, and a load; and said pump means causing the level of the fluid activating said current control means to drop in the chamber containing said current control means to deenergize said load means; said conductive fluid returned to contact with said current control means by pressure differentials between said atmospheres in said chambers.

2. In a device of the class described: power means; conductive fluid reservoir means partially filled with a conductive fluid and including two chambers joined by passage means; each said chamber including a separate atmosphere isolated in said chamber between said fluid and the top of said chamber; each of said chambers including current control means capable of being activated by said conductive fluid; pump means included in said passage means between said chambers; said pump means energized by said power means through a circuit including first chamber current control means, said fluid, and a load; and switch means in series circuit with said second chamber current control means, said power means, and said pump means; said second chamber current control means being activated thereby energizing said pump means upon rise of said fluid in said second chamber because of a predetermined current flow in said load.

3. In a device of the class described: power means; conductive fluid reservoir means partially filled with a conductive fluid and including two chambers joined by passage means; each said chamber including a separate atmosphere isolated in said chamber between said fluid and the top of said chamber; electrode means capable of being short circuited by said conductive fluid inserted in each of said chambers; pump means included in said passage means between said chambers; said pump means energized by said power means through a circuit including first chamber electrode means, said fluid, and a load; and switch means in series circuit with said second chamber electrode means, said power means, and said pump means; said second chamber electrode means being short circuited thereby energizing said pump means upon rise of said fluid in the second chamber because of a predetermined current flow in said load, and thereby further causing a level of the fluid in the first chamber to drop and de-energize said load means.

4. In a device of the class described: power means; conductive fluid reservoir means partially filled with a conductive fluid and including two chambers joined by passage means; each said chamber including a separate atmosphere isolated in said chamber between said fluid and the top of said chamber; said reservoir means further including a fluid level adjusting means; each of said chambers including electrode means capable of being short circuited by said conductive fluid; pump means included in said passage means between said chambers; said pump means energized by said power means through a circuit including first chamber electrode means, said fluid, and a load; and normally closed switch means in series circuit with said second chamber electrode means, said power means, and said pump means; said second chamber electrode means being short circuited thereby energizing said pump means upon rise of fluid in the second chamber because of a predetermined current flow in said load, and thereby further causing the level of the fluid in the first chamber to drop and de-energize said load means.

5. In a device of the class described: power means; conductive fluid reservoir means partially filled with a conductive fluid and including two chambers joined by passage means; each said chamber including a separate atmosphere isolated in said chamber between said fluid and the top of said chamber; said reservoir means further including a fluid level adjusting means; each of said chambers including electrode means capable of being short circuited by said conductive fluid; electromagnetic conductive fluid pump means included in said passage means between said chambers; said pump means energized by said power means through a circuit including first chamber electrode means, said fluid, and a load; and normally closed switch means in series circuit with said second chamber electrode means, said power means, and said pump means; said second chamber electrode means being short circuited thereby energizing said pump means upon rise of said fluid in said second chamber because of a predetermined current flow in said load, and thereby further causing the level of the fluid in the first reservoir to drop and de-energize said load means; said conductive fluid returned to contact with said first chamber electrode means by pressure differentials between said atmospheres in said chambers.

References Cited in the file of this patent

UNITED STATES PATENTS

| | | |
|---|---|---|
| 1,660,407 | Bainbridge | Feb. 28, 1928 |
| 1,747,044 | Bainbridge | Feb. 11, 1930 |
| 1,773,036 | Fitzgerald | Aug. 12, 1930 |
| 2,157,890 | Dehn | May 9, 1939 |
| 2,158,009 | Hufnagel | May 9, 1939 |
| 2,669,873 | Gardner | Feb. 23, 1954 |
| 2,802,918 | Boyle | Aug. 13, 1957 |

FOREIGN PATENTS

| | | |
|---|---|---|
| 547,327 | Great Britain | Aug. 24, 1942 |